United States Patent [19]
Blumer et al.

[11] Patent Number: 5,732,219
[45] Date of Patent: Mar. 24, 1998

[54] COMPUTER SYSTEM AND COMPUTER-IMPLEMENTED PROCESS FOR REMOTE EDITING OF COMPUTER FILES

[75] Inventors: Thomas P. Blumer, Cambridge, Mass.; Peter R. Amstein, San Francisco; Scott F. Drellishak, Sunnyvale, both of Calif.; Randy J. Forgaard, Lexington; Andrew J. Schulert, Cambridge, both of Mass.

[73] Assignee: Vermeer Technologies, Inc., Cambridge, Mass.

[21] Appl. No.: 406,360

[22] Filed: Mar. 17, 1995

[51] Int. Cl.⁶ .......................... G06F 13/14; G06F 13/42; G06F 15/16

[52] U.S. Cl. .................. 395/200.57; 364/DIG. 1; 364/DIG. 2; 380/25

[58] Field of Search ........................ 395/800, 500, 395/200.15, 200.16, 200.01, 200.06, 200.5, 600, 700, 650, 200.03, 155, 200.12, 200.09; 364/DIG. 1, DIG. 2, 401 R

[56] References Cited

U.S. PATENT DOCUMENTS

| | | | |
|---|---|---|---|
| 5,093,914 | 3/1992 | Coplien et al. | 395/700 |
| 5,218,695 | 6/1993 | Noveck et al. | 395/600 |
| 5,220,674 | 6/1993 | Morgan et al. | 395/800 |
| 5,287,103 | 2/1994 | Kasprzyk et al. | 340/852.52 |
| 5,410,688 | 4/1995 | Williams et al. | 395/600 |
| 5,418,945 | 5/1995 | Carter et al. | 395/600 |
| 5,515,508 | 5/1996 | Pettus et al. | 395/200.01 |
| 5,553,285 | 9/1996 | Krakauer et al. | 395/183.2 |

OTHER PUBLICATIONS

Ed Taylor, "Demystifying TCP/IP", Word Ware Publishing, Inc., pp. 23–33, 1993, Texas.

Neil Randall and Wayne Russell, "Virtual Private Networking with Windows NT", PC Magazine, pp. 263–264, Sep. 09, 1997.

Robin Burk et al. "TCP/IP Blueprints", Sams Publishing, pp. 174–176, 226–228, 1997, IN.

Tim Berners-Lee et al., "The World-Wide Web," Communications of the ACM, Internet Technology, Aug. 1994, vol. 37, No. 8, pp. 76–82.

Tim Berners-Lee et al., "World-Wide Web: The Information Universe," Electronic Networking: Research, Applications and Policy, vol. 1, No. 2, Meckler, Westport CT, Spring 1992.

Douglas C. McArthur, "World Wide Web & HTML," Dr. Dobb's Journal, Dec., 1994, pp. 18–26, 86.

Larry Press, "The Internet Is Not TV: Web Publishing," Communications of the ACM, Mar. 1995, vol. 38, No. 3.

Jeff Frentzen et al, "Setting Up Shop On The Internet," Windows Sources, Feb. 1995, p. 64ff.

(List continued on next page.)

*Primary Examiner*—Daniel H. Pan
*Attorney, Agent, or Firm*—Ronald M. Anderson

[57] ABSTRACT

A client/server computer system for remote editing of document objects stored on the server includes a client computer connected to a server computer via a communication channel over which messages are sent in a communication protocol. Typically, the client computer has an operating system with a first file name space and the server computer has an operating system with a second file name space and the first file name space does not include names of files which map to names of files in the second file name space. The connection is preferably a TCP/IP connection providing data transport according to TCP/IP. Messages in the HTTP protocol are preferably used. The client computer sends request messages to the server. A request message may indicate a request for either retrieval or storage of a document object, such as an HTML document or script program. The server receives the request messages and processes them to either store a document object or retrieve a document object and return it to the client in a response message. When the server is an HTTP server, the request messages from the client are processed by a single control script. The messages from the client indicate a desired document object and the action to be performed.

30 Claims, 7 Drawing Sheets

OTHER PUBLICATIONS

Larry Seltzer et al., "Beyond Mosaic: Three New Internet Browsers," *Windows Sources*, Feb. 1995, p. 42.

Frentzen, J., et al., "The Cover Story, Internet Servers," *Windows Sources*, Feb. 1995, pp. 64–67, 70, 73–74, 77–80, 106, 108, 111, 113–114, 117–120, 122, 125, 128, 134–136, 138–140, and 143.

Berners–Lee, T., et al., "World–Wide Web: The Information Universe," a preprint of: article from *Electronic Networking: Research, Applications and Policy*, vol 1 No 2, Meckler, Westport CT, Spring 1992, 9 pages.

Press, L., "The Internet is Not TV: Web Publishing," *Communications of the ACM*, Mar. 1995, vol. 38, No. 3, pp. 17–23.

Berners–Lee, T. et al., "The World–Wide Web," *Communications of the ACM, Internet Technology*, Aug. 1994, vol. 37, No. pp. 76–82.

COMPUTER SYSTEM AND COMPUTER-IMPLEMENTED PROCESS FOR REMOTE EDITING OF COMPUTER FILES

FIELD OF THE INVENTION

This invention is related to computer editing systems for editing electronic documents, other information and computer programs. More particularly, this invention is related to computer editing systems for developing on-line services in a client-server information system.

BACKGROUND OF THE INVENTION

An on-line information system typically includes one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection.

Typical uses for on-line services include document viewing, electronic commerce, directory lookup, on-line classified advertisements, reference services, electronic bulletin boards, document retrieval, electronic publishing, technical support for products, and directories of on-line services, among others. The service may make the information available free of charge, or for a fee.

Information sources managed by the server may include files, databases and applications on the server system or on an external system. The information that the server provides simply may be stored on the server, may be converted from other formats manually or automatically, may be computed on the server in response to a client request, may be derived from data and applications on the server or other machines, or may be derived by any combination of these techniques.

The user of an on-line service uses a program running on the client system to access the information managed by the on-line service. Possible user capabilities include viewing, searching, downloading, printing, and filing the information managed by the server. The user may also price, purchase, rent, or reserve services or goods offered through the on-line service.

For example, an on-line service for catalog shopping might work as follows. The user runs a program on the client system and requests a connection to the catalog shopping service using a service name that either is well known or can be found in a directory. The request is received by the server, and the server returns an introductory page that also asks for an identifier and password. The client program displays this page, the user fills in an identifier and password that were assigned by the service in a previous visit, and the user's information is sent to the server. The server verifies the identifier and password against an authorization database, and returns a menu page that is then presented to the user. Each time the user selects a menu item, the selection is sent to the server and the server responds with the appropriate new page of information, possibly including item descriptions or prices that are retrieved from a catalog database. By selecting a series of menu items the user navigates to the desired item in the catalog, and requests that the item be ordered. The server receives the order request, and returns a form where the user fills in some information about shipping and billing. The user response is returned to the server, and the server enters the order information into an order database.

On-line services are available on the World Wide Web (WWW), operating over the global Internet in which a large number of computers, or sites, are interconnected. The WWW is a "web" of interconnected document objects that are located on various sites on the Internet. The WWW is also described in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by Berners-Lee, T., et al., in *Electronic Networking: Research, Applications and Policy*, Vol. 1, No. 2, Meckler, Westport, Conn., Spring 1992. Among the types of document objects on the WWW are documents and scripts. Documents that are published on the WWW are written in the Hypertext Markup Language (HTML), such as described in *Hypertext Markup Language Specification*—2.0, by T. Berners-Lee and D. Connolly, Internet Draft Document, Oct. 14, 1994, and in "World Wide Web & HTML," by Douglas C. McArthur, in *Dr. Dobbs Journal*, December 1994, pp. 18–20, 22, 24, 26 and 86. HTML documents stored as such are generally static, that is, the contents do not change over time unless the service developer modifies the document. Scripts are programs that can generate HTML documents when executed.

HTML is a language used for writing hypertext documents. The formal definition is that HTML documents are Standard Generalized Markup Language (SGML) documents that conform to a particular Document Type Definition (DTD). An HTML document includes a hierarchical set of markup elements, where most elements have a start tag, followed by content, followed by an end tag. The content is a combination of text and nested markup elements. Tags are enclosed in angle brackets ('<' and '>') and indicate how the document is structured and how to display the document, as well as destinations and labels for hypertext links. There are tags for markup elements such as titles, headers, text attributes such as bold and italic, lists, paragraph boundaries, links to other documents or other parts of the same document, in-line graphic images, and many other features.

For example, here are several lines of HTML:

Some words are <B>bold</B>, others are <I>italic</I>. Here we start a new paragraph.<P>Here's a link to the <A HREF="http://www.vermeer.com">Vermeer Technologies, Inc.</A>home page.

This sample document is a hypertext document because it contains a "link" to another document, as provided by the "HREF=." The format of this link will be described below. A hypertext document may also have a link to other parts of the same document. Linked documents may generally be located anywhere on the Internet. When a user is viewing the document using a Web browser (described below), the links are displayed as highlighted words or phrases. For example, using a Web browser, the sample document above would be displayed on the user's screen as follows:

Some words are bold, others are italic. Here we start a new paragraph.

Here's a link to Vermeer Technologies, Inc. home page.

In the Web browser, a link may be selected, for example by clicking on the highlighted area with a mouse. Selecting a link will cause the associated document to be displayed. Thus, clicking on the highlighted text "Vermeer Technologies, Inc." would display that home page.

Another kind of document object on the WWW is a script. A script is an executable program, or a set of commands stored in a file, that can be run by a Web server (described below) to produce an HTML document that is then returned to the Web browser. Typical script actions include running library routines or other applications to get information from a file or a database, or initiating a request to get information from another machine, or retrieving a document corresponding to a selected hypertext link. A script is run on the Web server when, for example, the end user selects a particular hypertext link in the Web browser, or submits an HTML form request. Scripts are usually written by a service developer in an interpreted language such as Basic or Tool Control Language (Tcl) or one of the Unix operating system shell languages, but they also may be written in programming languages such as the "C" programming language and then compiled into an executable program. Programming in Tcl is described in more detail in *Tcl and the Tk Toolkit* by John K. Ousterhout, Addison-Wesley, Reading, Mass., USA, 1994.

Each document object in the WWW has an identifier called a Uniform Resource Identifier (URI). These identifiers are described in more detail in *Universal Resource Identifiers for the World Wide Web*, T. Berners-Lee, submitted as an Internet Request for Comments (RFC) as yet unnumbered. A URI allows any object on the Internet to be referred to by name or address, such as in a link in an HTML document as shown above. There are two types of URIs: a Universal Resource Name (URN) and a Uniform Resource Locator (URL). A URN references an object by name within a given name space. The Internet community has not yet defined the syntax of URNs. A URL references an object by defining an access algorithm using network protocols. An example URL is "http://www.vermeer.com" A URL has the syntax "scheme://host:port/path?search" where "scheme" identifies the access protocol (such as HTTP, FTP or GOPHER); "host" is the Internet domain name of the machine that supports the protocol; "port" is the transfer control protocol (TCP) port number of the appropriate server (if different from the default); "path" is a scheme specific identification of the object; and "search" contains optional parameters for querying the content of the object.

An Internet site that wishes to make documents available to network users is called a "Web site" and must run a "Web server" program to provide access to the documents. A Web server program is a computer program that allows a computer on the network to make documents available to the rest of the WWW. The documents are often hypertext documents in the HTML language, but may be other types of documents as well, as well as images, audio and video information. The information that is managed by the Web server includes hypertext documents that are stored on the server or are dynamically generated by scripts on the Web server. Several Web server software packages exist that provide information on the Web, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc II workstation running the Unix operating system, and personal computers with the Intel Pentium processor running the Microsoft MS-DOS operating system and the Microsoft Windows operating environment. The Web server also has a standard interface for running external programs, called the Common Gateway Interface (CGI). A gateway is a program that handles incoming information requests and returns the appropriate document or generates a document dynamically. For example, a gateway might receive queries, look up the answer in an SQL database, and translate the response into a page of HTML so that the server can send the result to the client. A gateway program may be written in a language such as "C" or in a scripting language such as Practical Extraction and Report Language (Perl) or Tcl or one of the Unix operating system shell languages. Perl is described in more detail in *Programming Perl*, by Larry Wall and Randal L. Schwartz, O'Reilly & Associates, Inc., Sebastopol, Calif., USA, 1992. The CGI standard specifies how the script or application receives input and parameters, and specifies how any output should be formatted and returned to the server.

Generally speaking, for security reasons, a Web server machine may limit access to files. For all access to files on the Web server, the Web server program running on the server machine may provide an extra layer of security above and beyond the normal file system and login security procedures of the operating system on the server machine. The Web server program may add further security rules such as: 1) optionally requiring user name and password, completely independent of the normal user name and passwords that the operating system may have on user accounts, 2) allowing definitions of groups of users for security purposes, independent of any user group definitions of the operating system, 3) access control for each document object such that only specified users (with optional passwords) or groups of users are allowed access to the object, or that access is only allowed for clients at specific network addresses, or some combination of these rules, 4) allowing access to the document objects only through a specified subset of the possible HTTP methods, 5) allowing some document objects to be marked as HTML documents, others to be marked as executable scripts that will generate HTML documents, and others to be marked as other types of objects such as images. Access to the online service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tried to access documents on the Web server directly would need to understand this name mapping.

A user (typically using a machine other than the machine used by the Web server) that wishes to access documents available on the network at a Web site must run a client program called a "Web browser." The browser program allows the user to retrieve and display documents from Web servers. Some of the popular Web browser programs are: the Navigator browser from NetScape Communications, Corp., of Mountain View, Calif.; the Mosaic browser from the National Center for Supercomputing Applications (NCSA); the WinWeb browser, from Microelectronics and Computer Technology Corp. of Austin, Tex.; and the InternetWorks browser, from BookLink Technology, of Needham, Mass. Browsers exist for many platforms, including personal computers with the Intel Pentium processor running the Microsoft MS-DOS operating system and the Microsoft Windows environment, and Apple Macintosh personal computers.

The Web server and the Web browser communicate using the Hypertext Transfer Protocol (HTTP) message protocol and the underlying TCP/IP data transport protocol of the Internet. HTTP is described in *Hypertext Transfer Protocol—HTTP/1.0*, by T. Berners-Lee, R. T. Fielding, H. Frystyk Nielsen, Internet Draft Document, Dec. 19, 1994, and is currently in the standardization process. In HTTP, the Web browser establishes a connection to a Web server and sends an HTTP request message to the server. In response to an HTTP request message, the Web server checks for authorization, performs any requested action and returns an HTTP response message containing an HTML document resulting from the requested action, or an error message. The returned HTML document may simply be a static file stored on the Web server, or it may be created dynamically using a script called in response to the HTTP request message. For instance, to retrieve a static document, a Web browser sends an HTTP request message to the indicated Web server, requesting a document by its URL. The Web server then retrieves the document and returns it in an HTTP response message to the Web browser. If the document has hypertext links, then the user may again select a link to request that a new document be retrieved and displayed. As another example, a user may fill in a form requesting a database search, the Web browser will send an HTTP request message to the Web server including the name of the database to be searched and the search parameters and the URL of the search script. The Web server calls a program or script, passing in the search parameters. The program examines the parameters and attempts to answer the query, perhaps by sending a query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) are a standardized way for describing the content of messages that are passed over a network. HTTP request and response messages use MIME header lines to indicate the format of the message. MIME is described in more detail in *MIME (Multipurpose Internet Mail Extensions): Mechanisms for Specifying and Describing the Format of Internet Message Bodies*, Internet RFC 1341, June 1992.

The request methods defined in the current version of the HTTP protocol include GET, HEAD, POST, PUT, DELETE, LINK, and UNLINK. The GET method requests that the server retrieve the object indicated by the given URL and send it back to the client. If the URL refers to a document, then the server responds by sending back the document. If the URL refers to an executable script, then the server executes the script and returns the data produced by the execution of the script. Web browser programs normally use the GET method to send request messages to the Web server to retrieve HTML documents, which the Web browser then displays on the screen at the client computer.

According to the HTTP specification, the PUT method specifies that the object contained in the request should be stored on the server at the location indicated by the given URL. However, the current server implementations do not follow this specification; they simply handle all PUT requests through a single PUT script, which is generally undefined, and must be created by a service author. Web browsers generally do not use the PUT method.

The POST method sends data, usually the user input parameters from an HTML form, to the server. The POST request also contains the URL of a script to be run on the server. The server runs the script, passing the parameters given in the request, and the script generates HTML output to be returned in the response to the client. In order for a client program to send arbitrary data to the Web server using the current HTTP protocol, the client program must use either the PUT method or the POST method, as these are the only two methods that allow such data transfer to the Web server.

Having now described the World Wide Web, a typical on-line service on the WWW will now be described. An on-line service on the World Wide Web includes a Web server program running on a Web server machine, and a set of service files that characterize the on-line services that are stored on the Web server machine. The service files include HTML documents, executable scripts or programs to dynamically produce HTML documents, and other files of service information that can be referenced and updated by the scripts and programs. The actual data and scripts that make up a particular on-line service, including HTML documents and script programs, are generally stored on the server in a separate area for each service. Global information about the service is also stored, including data such as the name of the service, the name of the author, revision history, comments about the service, and authorization information. The end user of the on-line service uses a Web browser program on the client machine to send requests to the on-line service and to receive responses from the on-line service. All access by an end user of the on-line service to the service files is managed and controlled by the Web server program. For example, an on-line service might consist of a corporate home page which is a static document, with a link to a second document that is a form for searching the store catalog. The search form may have a "submit" button that causes a script to be run on the Web server, to generate a list of product descriptions with prices that is then returned to the Web browser as an HTML document. Each of the HTML documents may have a link to a second script that collects and displays the items that have been ordered. The service also has configuration information such as the list of authorized users of the service, and their passwords.

FIG. 1 shows the steps in using an on-line service, as seen by the end user of the on-line service on the client machine. The end user starts a Web browser program in step 10, and the program determines the URL of an initial document to display in step 12. The initial document URL may be determined from a configuration file, or may be programmed into the Web browser, or may be entered by the user. The browser then sends an HTTP GET request to the Web server in step 14, giving the URL of the desired document. The browser then waits for a response from the Web server in step 16. The browser tests the response in step 18 to determine if it indicates an error message. If the response message from the Web server indicates an error, for instance if the requested document is not found, then the browser reports the error to the end user in step 22. Otherwise the response message from the Web server contains the requested document, and the Web browser formats and displays the document on the screen in step 20 according to the HTML language conventions. In either case the browser then waits for the user to enter the next command (step 24). For example, the user may request to view a new document by selecting a hypertext link to a document, by requesting a document from a list of previously visited documents, or by typing in the URL of a document that was obtained by the user through some other means. The browser tests the user command to determine if the user is requesting a new document in step 26. If so, processing continues at step 14 which has already been discussed. If the user is not requesting a new document then the browser tests the command in step 30 to determine if it is a request to exit the program. If so, processing stops. Otherwise the command is a local command that is handled by the browser without sending an HTTP request in step 28. The end user may use local viewing commands such as commands to scroll around in the document, or commands to search for a particular text string in the document. After the browser handles the local command, the browser again waits for the next user command as already discussed, in step 24.

FIG. 2 shows the operation of an on-line service on the World Wide Web as seen by the Web server program. When the server is started, it runs continuously, waiting to receive a command over the network connection from a client Web browser program in step 40. The server tests the received command in step 44 to determine if it is a GET request. If it is a GET request, then the server examines the URL contained in the request in step 52 to determine if the URL indicates a static HTML document stored on the server. If the URL does refer to a static document then that document is returned to the Web browser via an HTTP response in step 58. Otherwise the URL indicates a script stored on the server, and the Web server runs the script to produce an HTML document in step 56 which is then returned to the Web browser as described before in step 58. If the test of step 44 determines that the command is not a GET request, then the server tests the command in step 48 to determine if it is a POST request. If so, the server retrieves the parameters from the POST request in step 54, which include the URL for the script and the parameters for the script. The server then runs the indicated script in step 56 to generate an HTML document which is then returned to the Web browser as described before in step 58. After an HTML document is returned to the Web browser, processing continues at step 40. If the test of step 48 determines that the command is not a POST request then the server returns an error message to the Web browser in step 50, formatted as an HTML document. The processing continues at step 40 and the server again waits for the next request and the process repeats.

On-line services such as those described above are in high demand. Unfortunately, the task of developing an on-line service is currently one that almost always requires extensive programming skill and much specialized knowledge. There exists a great need for tools that will simplify the process of building an on-line service so that the process will take less time, be less error prone, and can be done by a nonprogrammer. In some cases, software tools exist to help convert the content data for the service from its native format to the format required by the server, but these tools only address the conversion of static data files.

For example, in order to construct an on-line service for the World Wide Web, the service author performs a combination of the tasks, such as creating a new HTML document for a page of hypertext included in the on-line service, creating a new script included in the on-line service, retrieving and modifying an existing HTML document from the Web server machine, retrieving and modifying an existing script from the Web server machine, and storing an HTML document or script on the Web server machine so that the Web server program will have access to it.

There are several approaches known in the prior art for constructing documents and scripts of an online service on the Web, and performing the tasks noted above. The first approach is that the service author runs a text or HTML editor program on the Web server machine to create or modify the line service documents and scripts that are stored on the server.

The problem with the first approach is that the service author must be working at the Web server machine, or at least working at a terminal which is directly connected with the server machine. This is not always practical, because the service author may be at a location which is physically remote from the server machine. It also often happens that the server machine requires a high level of security because of the nature of the resources on the server machine that may be shared among a number of users. In this case access to the machine is often limited to the system administrators, and the service author may not have access to the machine for security reasons. For example, the only access to files used by the Web server may be through the Web server alone.

The second approach is that the service author may run a terminal emulation program on a client machine to establish a connection to the server machine over a network connection or a modem line. The terminal emulation program allows the user to run programs on the server machine as though the user were working directly on that machine, and with this arrangement the user runs a text or HTML editor program on the server to create or modify the on-line service documents and scripts as before.

The second approach has the problem that the server machine and client machine must both run additional programs to allow terminal emulation and remote execution of programs over a network. This adds to the complexity on both machines, and also requires that the service author be familiar with a terminal emulation program which typically has a difficult user interface that is not meant for nonexperts. This approach also adds another route from other machines to the server machine, which may be undesirable for security reasons. As with the first approach, the service author may not have access to the server machine for security reasons, or may not have authorization to write files to the machine.

In the third approach, the service author first transfers existing service documents and scripts from the server machine to a client machine either manually or via a network file transfer program. The author then runs a text or HTML editor program on a client machine to create or modify documents on that machine, and then transfers the completed documents back to the server machine either manually or via a network file transfer program, such as the file transfer protocol (ftp) or kermit, a file transfer method used with terminal emulation programs for communication over a modem.

The third approach is cumbersome because of the need for the separate steps of transferring the documents from the server back to the client, and transferring the documents back to the server after the editing is complete. This approach also has the security problems mentioned above for the other approaches.

Each of these three approaches also has the problem that the file names used for documents by a Web server are not always the same as the actual file names of the documents. An author of an on-line service will need to learn the mappings of file names to the URLs used by the Web server.

There is also the World Wide Web computer program, for use with a NeXT computer, that consists of a client browser program that is able to retrieve files from a Web server, and a client HTML editor that can edit the retrieved file. However, this program is not able to save the edited files to the Web server. Instead, this approach is similar to the third approach discussed above in that a file transfer program is still needed to place the edited document back on the Web server. This approach also is not a complete solution for authoring an on-line service for the Web because the types of documents edited in this manner are limited to static HTML documents which are not processed in any way by the server.

SUMMARY OF THE INVENTION

To overcome the drawbacks of current methods for creating an on-line service on the World Wide Web, one embodiment of this invention provides a client authoring tool that can both retrieves and stores document objects on a Web server using a communication protocol in which messages are sent over a TCP/IP connection between the server and the client. In one embodiment, the communication protocol is HTTP, the same communication protocol used by Web browsers. The architecture of this system is applicable to other communication protocols and client/server on-line services.

One of the difficulties in implementing a client program to save files to a Web server using HTTP is that, although existing Web servers, such as the CERN server and the NCSA server, have support for the HTTP PUT and POST methods, these existing servers still require development and installation of a script on the server to handle either PUT or POST methods.

Another difficulty in implementing a method for remote authoring and editing of an on-line service over the HTTP protocol is that there are two types of component objects for the on-line service that are stored on the Web server. These are static HTML documents, and scripts that dynamically generate HTML documents upon request. If an authoring program would like to retrieve a script from the server, using the HTTP protocol, it cannot simply use the HTTP GET method that is normally used to retrieve documents and access scripts during the operation of an on-line service. The reason is that the HTTP GET method, when used to access a script, causes the script to be executed and returns an HTML document that is generated through execution of the script.

Another difficulty in editing documents for an on-line service in this environment is that a client authoring program generally does not have a file name space that includes the file names of the document objects of the on-line service on the server. Such an overlap in the file name space generally requires use of a network file system. Creation of a network file system including the authors of all on-line services on a server is generally impractical. Such a system is also generally too complex to set up easily and requires too much close interaction among systems than is practical on a large heterogenous public network like the Internet. In many cases, a client authoring system would not have access to the server anyway to enable the set up of a network file system.

To generally overcome these difficulties, one aspect of the invention is a computer-implemented process for remotely editing an electronic document stored on a server computer, using a client computer, wherein the server computer and the client computer are connected by a communication channel and send messages using a communication protocol. In this process, the client computer sends a request message using the communication protocol over the communication channel to the server requesting a copy of the electronic document. Next, the client receives a response message in the communication protocol from the server and over the communication channel, wherein the response message contains the copy of the electronic document. The client then permits a user to edit the copy of the electronic document at the client computer. To store the electronic document at the server, the client sends a message in the communication protocol including the edited electronic document over the communication channel and to the server, wherein the message includes an indication of a request that the electronic document be stored on the server computer at a particular location. Typically, the server sends a status response message indicating the outcome of the attempt to store the document.

In one embodiment, to overcome these difficulties, the authoring tool uses either PUT or POST HTTP request messages to request retrieval of scripts or documents and to request storage of edited or new documents or scripts. Currently available authoring tools may be readily modified to replace existing "open" and "save" functions to provide this capability. The server may be any standard Web server program such as the CERN server or the NCSA server. Our invention provides a control script which is executed by the server for each incoming PUT or POST HTTP request messages to determine whether a document is to be retrieved or replaced. The authoring tool program uses the HTTP protocol to communicate with a server program running on the server machine. The communication takes the form of the authoring tool sending a request to the server program, the server program executing a control script to perform the indicated action and write the results to an output file, and the server sending a response message back to the authoring client with the output. The output may be either a status message indicating that the action was performed successfully, or contents of a document or script that was retrieved, or an error message indicating why the action could not be performed. The server program may still communicate with browsers at the same time the authoring tool is being used. The server continually listens to incoming messages. If an incoming PUT or POST HTTP request is not from the authoring tool, it is handled in the same manner as other PUT or POST request messages from other client programs such as Web browsers. Otherwise, the server passes the request parameters to the control script. The control script checks the parameters to ensure that the request is valid, and checks that the user of the authoring tool has the proper authorization. The control script then carries out the request, retrieving or creating or modifying files of the appropriate on-line service as required.

Another aspect of the invention, in one embodiment, is a computer-implemented process for a client to remotely edit a document object stored on a server, wherein the client and the server send messages using the HTTP protocol over a TCP/IP connection. In this process, the client establishes a TCP/IP connection with the server. Then, the client sends an HTTP request message over the TCP/IP connection to the server, wherein the HTTP request message specifies the document object and an indication that the client requests retrieval of the document object. The server receives the HTTP request message and calls a control script. The control script checks authentication and retrieves a copy of the document object if access is authenticated. The server sends the copy of the document object to the client over the TCP/IP connection in an HTTP response message. The client receives the HTTP response message including the copy of the document object. The TCP/IP connection is terminated and the client permits a user to edit the copy of the document object. To store the edited or new document on the server, the client establishes a TCP/IP connection with the server and sends an HTTP request message to the server, wherein the HTTP request message contains a copy of the edited document and an indication of a location on the server to store the copy of the edited document object and an indication that the client requests storage of the edited document object. The server receives the HTTP request message and calls the control script. The control script stores the copy of the edited document object on the server at the location specified in the HTTP request message. The server sends an HTTP response message acknowledging an attempt at storage of the edited document object. Finally, the TCP/IP connection is terminated.

One advantage of this system is that current Web browsers do not need to be changed after installation of a control script at the Web server to permit use of an authoring tool in accordance with this invention. This benefit is obtained in one embodiment by utilizing an HTTP method not used by the Web browser, the PUT method, to handle requests from the authoring tool. With this embodiment, changes to authoring tool systems can be made transparently to users who merely view information or use an on-line service.

One advantage of this system over the prior art approaches is that the on-line service author can use a single client program and interface to retrieve a script or document from an existing on-line service on a server, edit or create a script or document for an on-line service, and save the resulting script or document to the appropriate place within the on-line service area on the server.

Another advantage of this system is that the author of on-line service can edit on-line service documents and scripts from any client machine, so long as the client machine can run a Web browser and communicate via HTTP protocol with the Web server that hosts the on-line service. The client machine and server machine may have different types of processors, with different architectures, running different operating systems, in a heterogenous network.

Another advantage of this system is that the authoring tool program communicates with the Web server program using the same type of network connection and the same protocol (HTTP) that is used by a Web browser talking to a Web server. This means that the remote editing facility of the invention will work from any client that can support a Web browser communicating with an on-line service. It also means that remote editing with this invention does not require any additional network connectivity programs other than those needed for a Web browser to communicate with a Web server.

Another advantage of this system is that the authoring tool uses the basic authentication procedures provided by the HTTP protocol and the Web server software. Access to files on the server machine may be limited to service authors with a validated user name and password. Thus, by using the HTTP protocol that is already used for on-line services on the World Wide Web, a minimal level of security is provided during the authoring process.

Another advantage of this system is that the authoring process can be used for remote retrieval, editing, and storing of at least two of the types of document objects that comprise an on-line service on the WWW: static HTML documents and script programs that generate HTML documents.

Remote editing of online service document objects using the method of this invention also has several advantages over the prior art approaches, such as remote editing over a network file system where a client machine can read and write files on a remote server machine. One advantage is that our invention allows access to the online service document objects only through the Web server program, and thus conforms to the additional security rules implemented by the server program. A second advantage is that since our invention uses the existing HTTP protocol mechanism of the Web server machine, the server machine does not have to run additional software or server programs that are required to implement a network file system or shared access to a remote file system from a client machine. This is an advantage because the additional software would add complexity and would add further possibilities for security loopholes. A third advantage is that our invention allows access to the online service document objects only through the Web server program, and thus conforms to the document object name mapping conventions between URLs and actual file names of the Web server program. The advantage of the method of our invention is that neither client programs nor service authors need to understand this file name mapping and only need to use the URLs.

DETAILED DESCRIPTION

Figure 1:
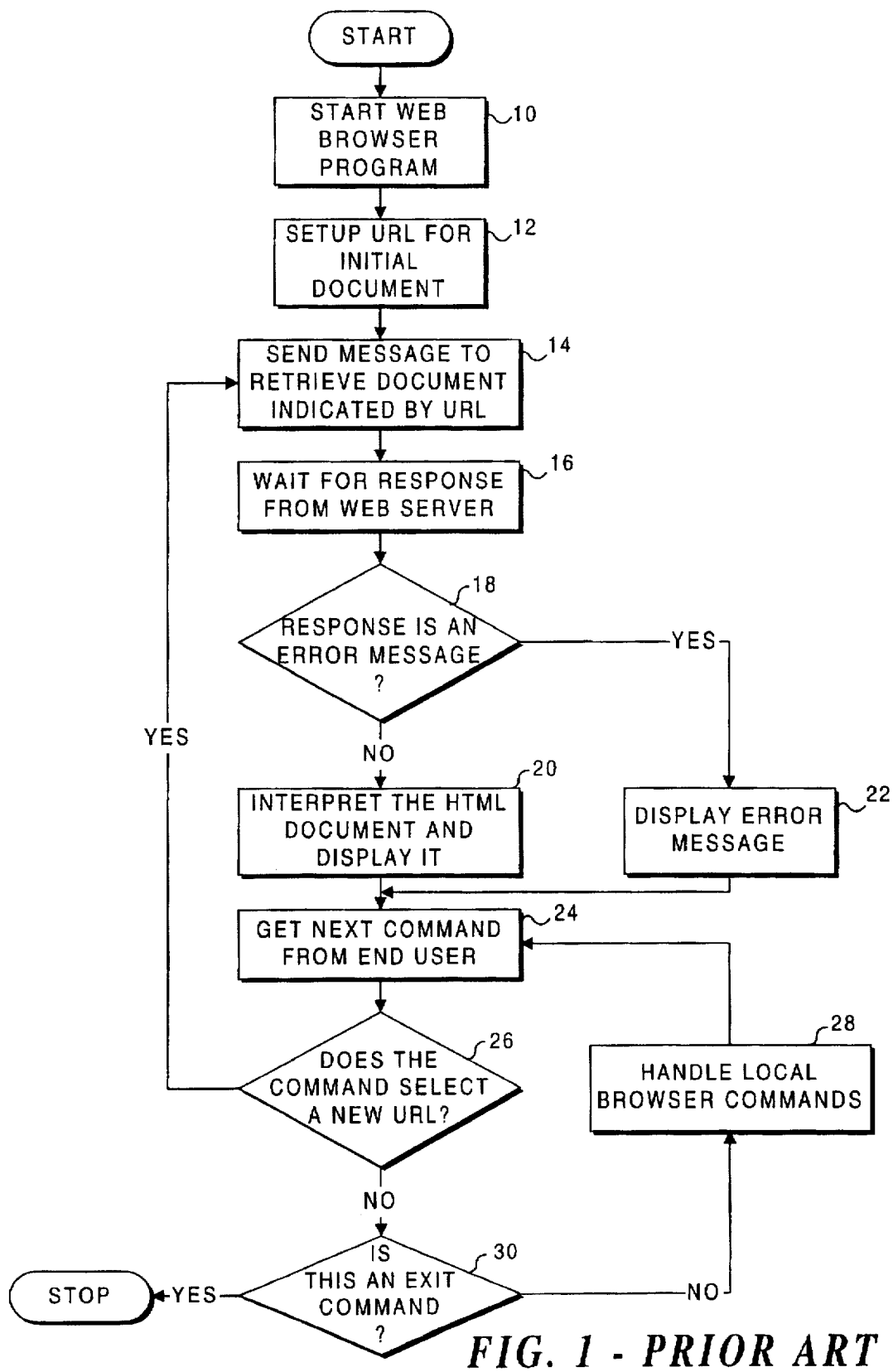
FIG. 1 shows the prior art sequence of activities on the Web browser during operation of an on-line service on the Web.
Figure 2:
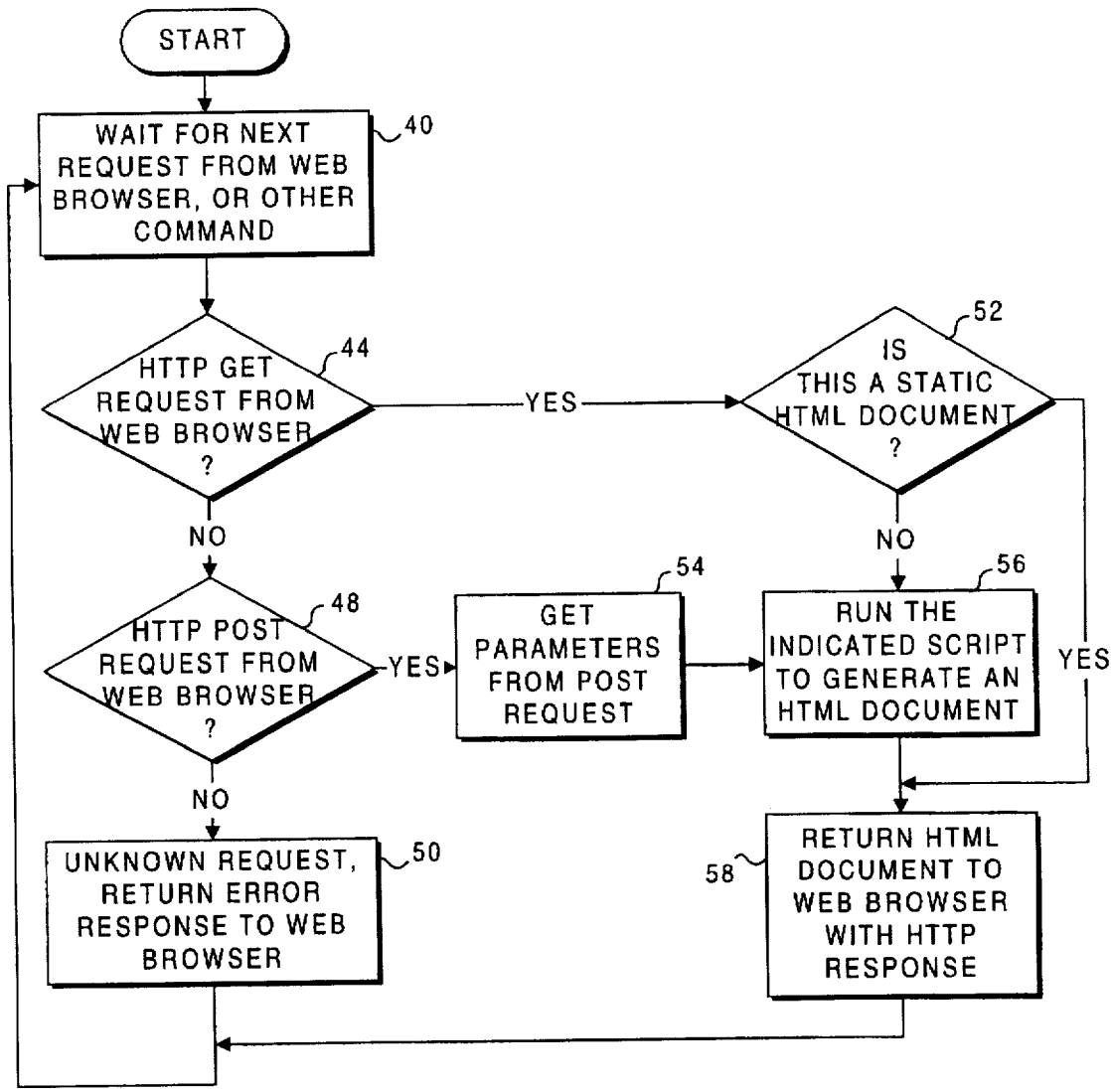
FIG. 2 shows the prior art sequence of activities on the Web server during operation of an on-line service on the Web.

The following detailed description of an illustrative embodiment of the invention is made by way of example only. It should be read in conjunction with the drawing, in which similar reference numbers indicate similar structures.

Figure 3:
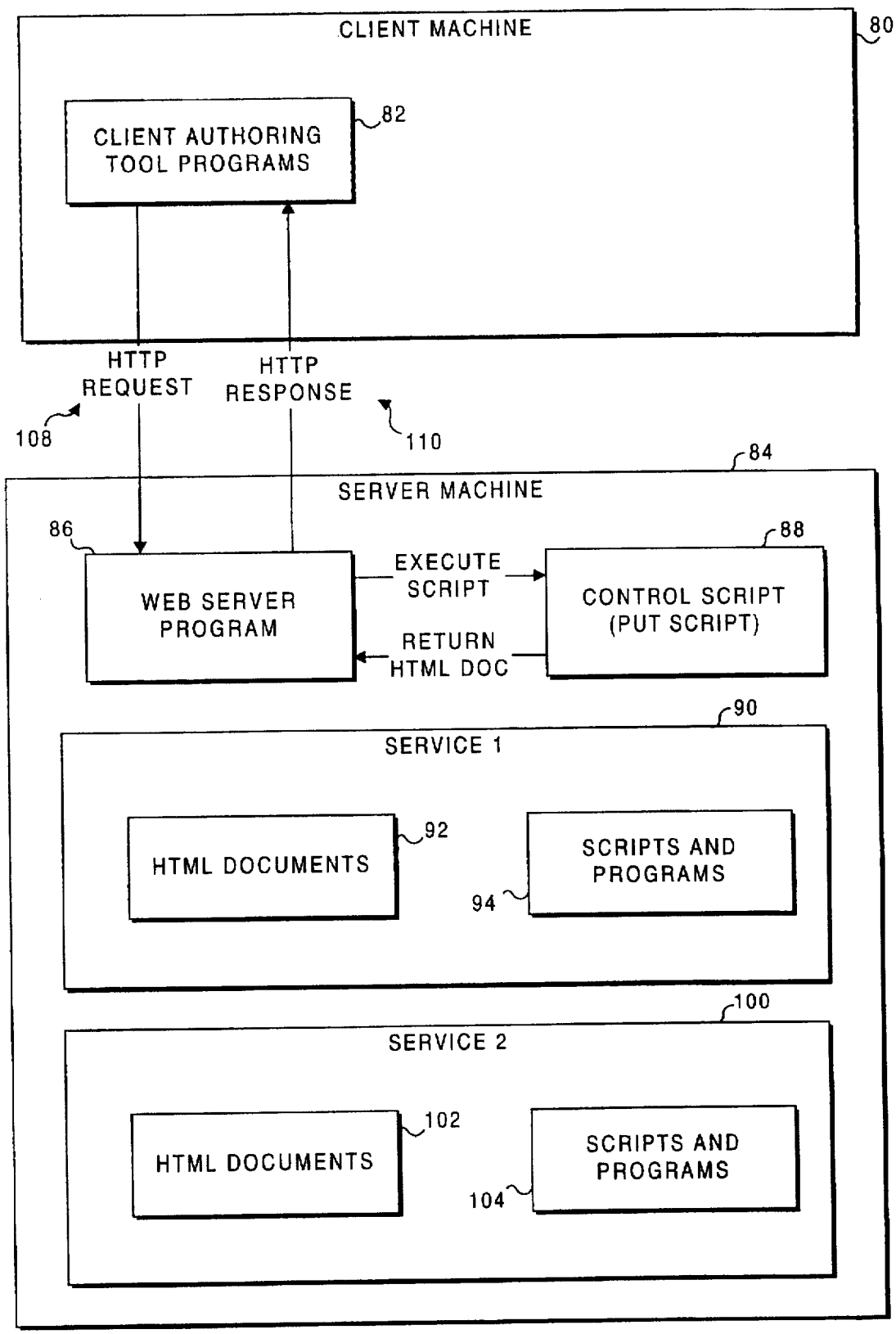
FIG. 3 shows an overview of the authoring framework for remote authoring of on-line services.

FIG. 3 shows an overview of a computer system for remote authoring of on-line services. The system includes a client machine 80 connected to a server machine 84 over a communication channel through which the client sends requests 108 and receives responses 110. The client machine has an authoring tool 82 which makes the requests 108. The server machine 84 has a server program 86 which sends responses 110 to the authoring tool 82. The server program 86 has an associated control script 88 which processes requests 108 and generates the responses 110 to be returned by the server program 86. The control script 88, in response to some requests 108, may be used to access on-line services 90 and 100. These services may be authored using the authoring tool 82 to generate appropriate documents 92 and 102 and programs 94 and 104. Generally speaking, the operating system of the client has a file name space which does not include or map to names of files on the server.

In one embodiment of the invention the client machine 80 is a PC with an Intel 80486 processor with a clock speed of 50 MHz, running the Microsoft Windows 3.1 operating system. The authoring tool 82 may be any of a variety of document editors, such as HTML editors, text editors, script editors and the like. The exact form of the authoring tool and the functionality of the editor are up to the needs and desires of the user. However, such an authoring tool allows the retrieval and storage of a document object on the Web server by generating an HTTP request message as described herein. Existing Web browsers could be modified to provide a storage function and editing capabilities to provide this functionality. Additionally, HTML and other editing tools may also be used in conjunction with this invention if modified to allow for retrieving and storing files on the server by generating appropriate HTTP messages as described below. A large number of HTML editors, such as HoTMetaL, from SoftQuad, Inc., of Toronto, Ontario, Canada, and other document editors and program editors, such as VisualBasic may be used to create documents and scripts and the invention is not limited thereby. For example, the client machine 80 may have dial-up connection to an Internet service provider, typically using a 14,400 baud or faster modem, and using the Trumpet 2.0b application for Microsoft Windows that provides the TCP/IP protocol software running over a SLIP connection using a normal telephone line. In this arrangement, the client machine 80 is connected to the Internet and has its own Internet address.

In this embodiment, the server machine 84 is a Gateway 2000 personal computer with an Intel Pentium processor with a clock speed of 60 MHz, running the BSDi Unix operating system. The Web server program 86 is the CERN Hypertext Transfer Protocol Daemon (HTTPD) server, configured for the Unix operating system. The server machine 84 also has a dial-up connection to an Internet service provider, using a 14,400 baud or faster modem, and using the TCP/IP and SLIP software that comes with the BSDi Unix operating system. Generally speaking, the Web server program is the only program providing access to documents, other than the operating system. It may define groups of users, user names, passwords and file names separately from the operating system of the server machine 84. With this configuration the client and server machines can establish a TCP/IP connection and exchange messages over the Internet. It should be understood that this embodiment is merely exemplary. A large variety of computers and operating systems have suitable server and client software for communicating using HTTP over the Internet. The client and server machines may also be connected by a local area network (LAN), wide area network (WAN) or may even be the same machine, but with different processes communicating together over a common communication channel. Although communication is generally provided over a TCP/IP connection, other network communication protocols, including other data transport protocols and message protocols may be used. A variety of message protocols for communicating over TCP/IP connections may be used, such as HTTP, FTP, telnet, etc. However, generally speaking, the server and the client do not share files through the file name spaces of their respective operating systems. That is, the file name space of the client does not include or map to names of files on the server. In other words, no pair of file names in the two file names spaces corresponds to the same file. More details about setting up client and server machines connected to the Internet and the World Wide Web are discussed in "Setting up Shop on the Internet," by Jeff Frentzen et at., and related articles in Windows Sources, February 1995, pp. 42, 64–67, 70, 73–74, 77–80, 106, 108, 111, 113–114, 117–120, 122, 125, 128, 134–136, 138–140 and 143.

Communication between the client authoring tool program on the client machine and the Web server program on the server machine can occur when both machines are connected to their respective Internet service providers. Communication between the server machine and client machine takes the form of the client sending an HTTP request to the server 108, the server processing the request, followed by the server replying with an HTTP response message to the client 110. In order to accomplish this, the client authoring tool program establishes a TCP/IP connection to the server program and sends the HTTP request message over that connection. The server program receives the HTTP request message, performs the indicated processing, and replies with an HTTP response message over the same connection. Finally the two programs terminate the TCP/IP connection.

In this embodiment, when an HTTP PUT request is received by the server program, the server program executes a control script 88 written in the Tcl programming language. A suitable control script is described in more detail below in connection with FIG. 5 and is also found in the attached appendix. The attached appendix contains material which is subject to copyright protection. The copyright owner has no objection to the facsimile reproduction by anyone of the patent document or the patent disclosure containing this appendix, as it appears in the Patent and Trademark Office patent file or records, but otherwise reserves all rights whatsoever.

It should be understood that the server program could just as well be programmed to respond to a POST request, given the current version of the HTTP standard. Other protocols, such as FTP could also be used. Different protocols and different messages could be used for both retrieval and storage. For example, FTP could be used to retrieve and HTTP could be used to store, or vice versa. Generally speaking, in this embodiment of the invention, the same type of message is used to process both retrieval and storage of both documents and scripts. The particular message type is not limiting of this invention. For example, a Web server may allow a user to define custom message types. The control script program handles requests to retrieve or store objects in the service data areas 90 and 100 on the server machine. There are two types of objects stored in each service data area: static documents in the HTML language 92 and 102, and script programs that generate HTML documents 94 and 104.

Figure 4:
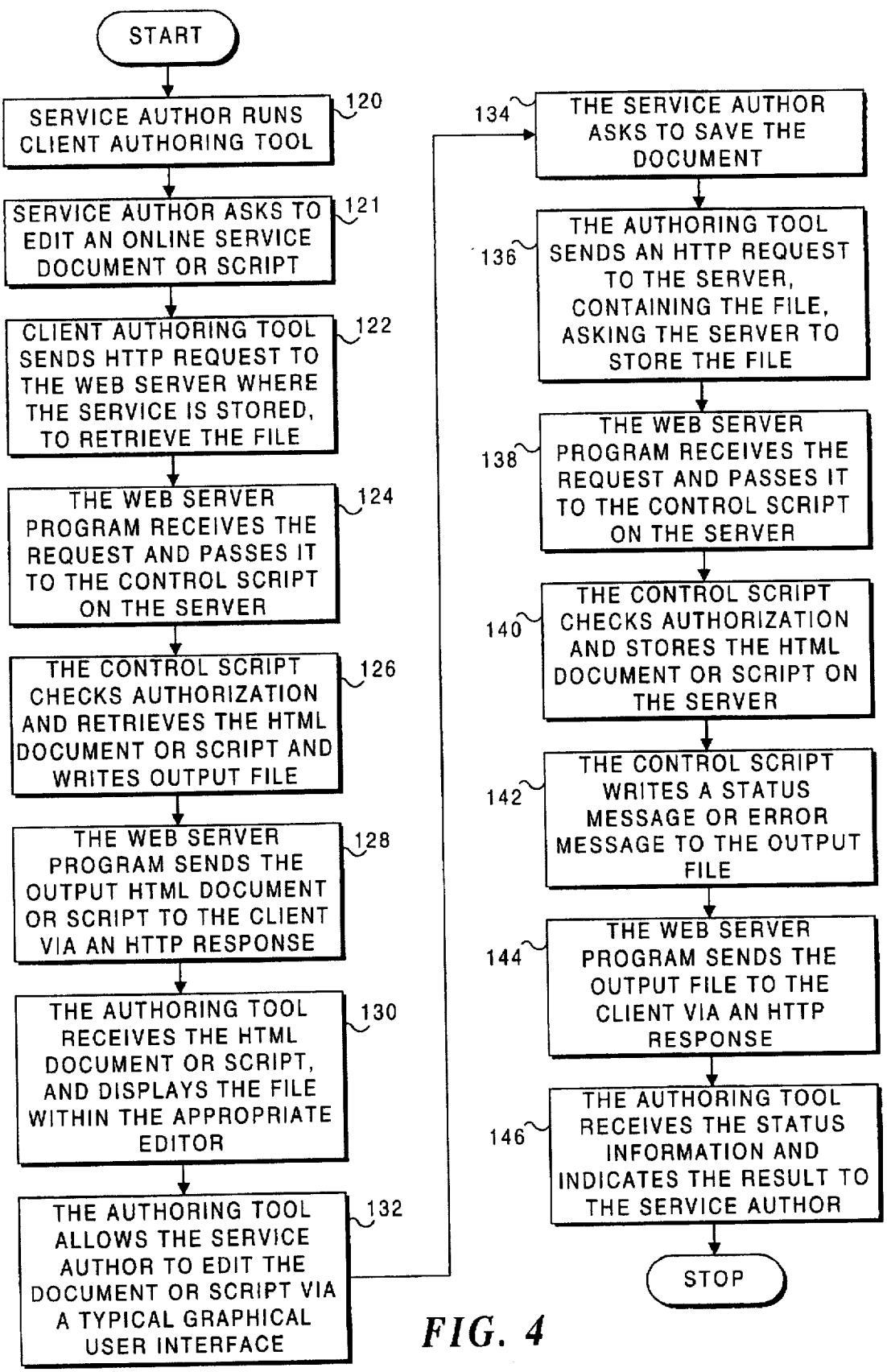
FIG. 4 shows the sequence of steps on the Web browser during remote authoring of an on-line service.

FIG. 4 shows a typical flow of control during one remote authoring session, where the service author uses the client machine to retrieve a document from the Web server, edit that document on the client machine, and save the document back to the Web server. FIG. 4 does not attempt to show editing, error handling, and graphical user interface features that are well known in the prior art for text editors and word processing programs. For instance it does not show that the user may be editing several documents independently within several windows, or that the user may abort an editing session at any time without saving a document, or that the user may retrieve, edit, save in one window and then repeat those steps for a different document in the same window. Futhermore, FIG. 4 does not attempt to show the editing commands that the user uses to make changes to the document on the client machine because these are well known in the art.

As shown in FIG. 4, the service author first rims the authoring tool program on the client machine in step 120, which provides a graphical user interface for remote editing. The author then asks in step 121 to edit a document or script from a particular on-line service, and identifies the object by specifying a document or script name, the service name, and the address of the Web server where the service is stored, such as by using its URL.

Figure 6A:
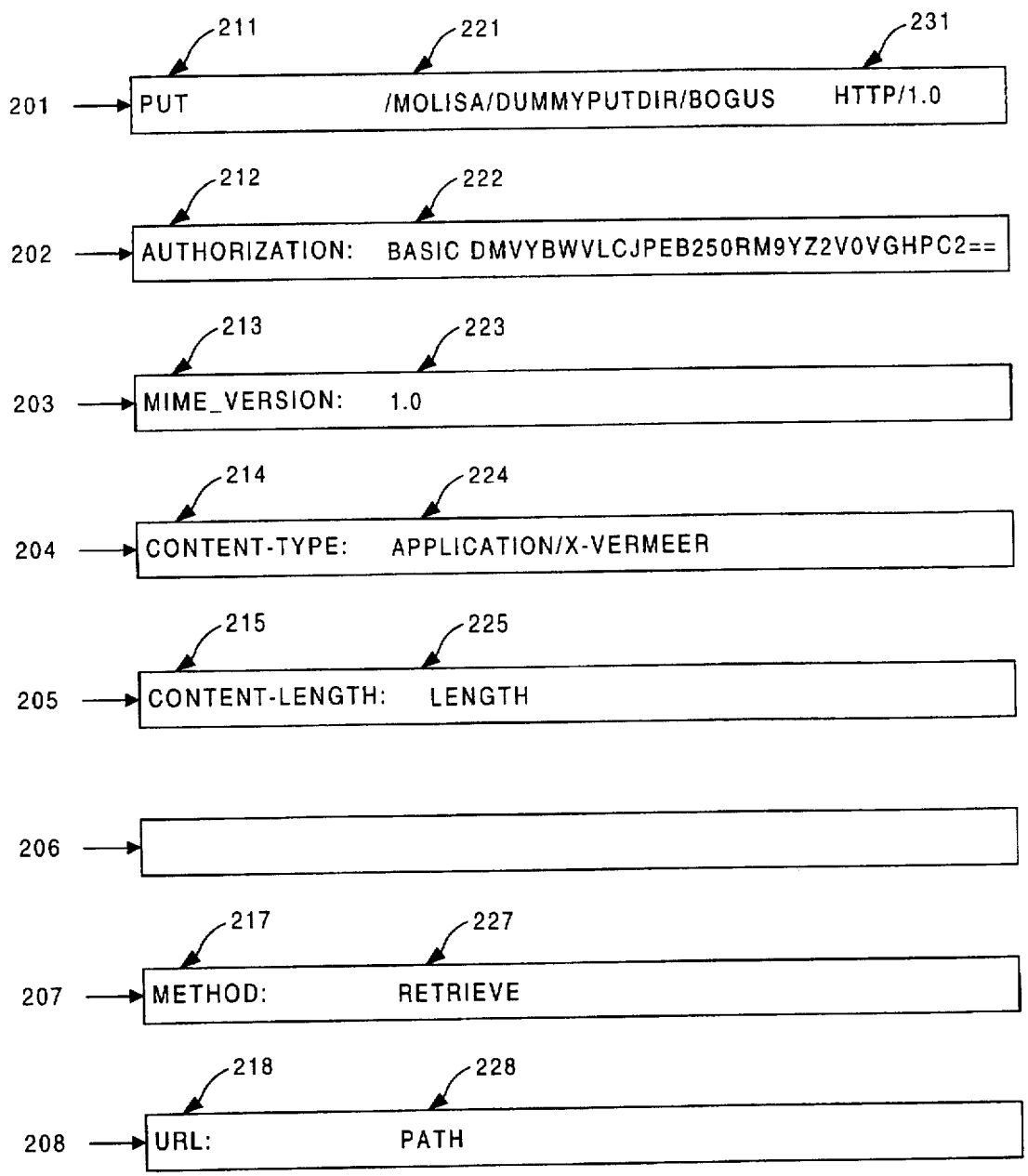
FIGS. 6a and 6b show the messages that the client authoring tool sends to the server.

The authoring tool program then sends in step 122 an HTTP PUT request to the Web server where the service is stored. The structure of this PUT request is shown in FIG. 6a which is described in more detail below, and includes header fields for authorization, the MIME version number, the request content type, and the content length in bytes. The body of the request includes a method command field that identifies the request as a retrieve request, and a URL command field that gives the URL for the document or script object to be retrieved.

Figure 5:
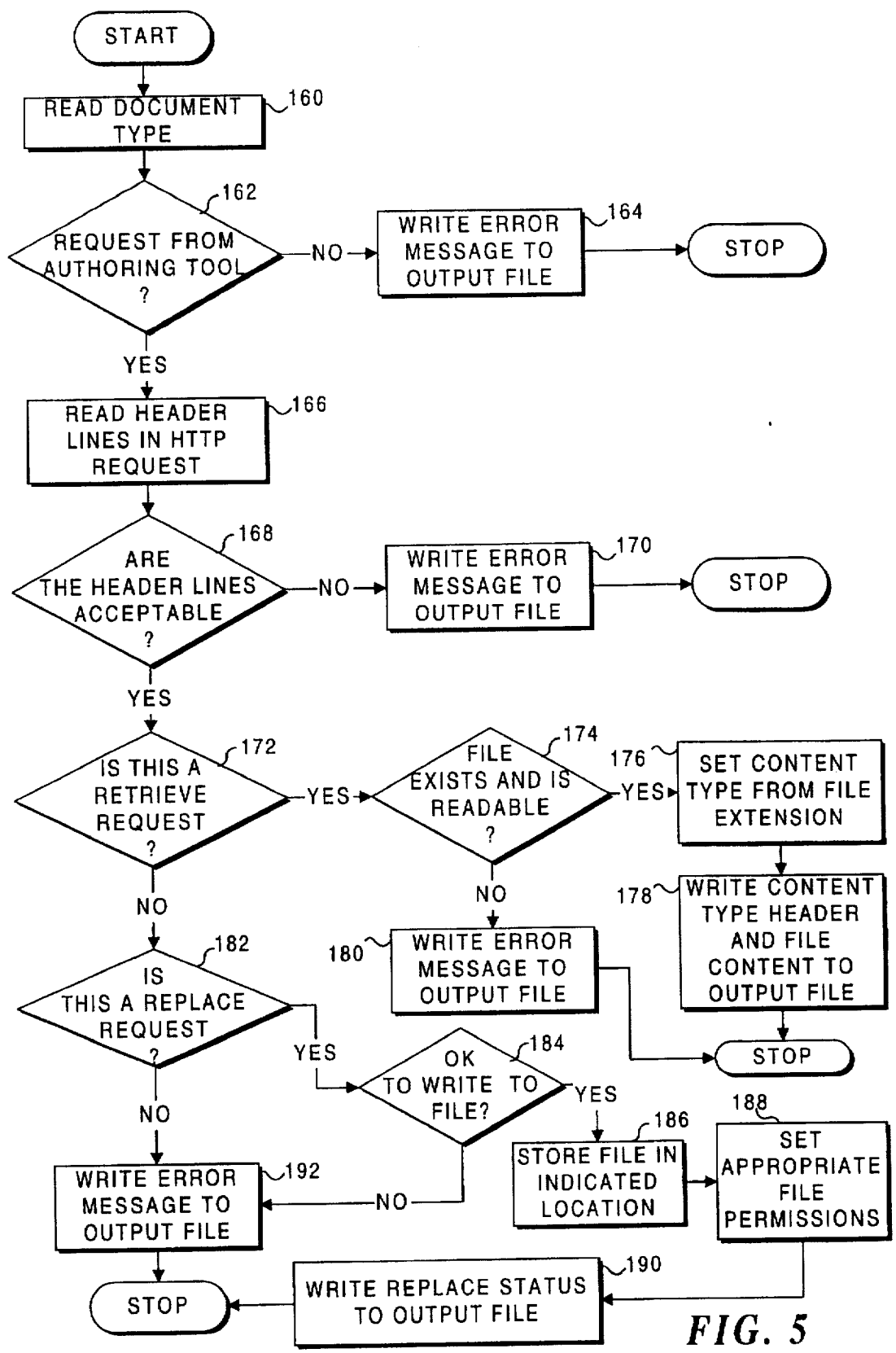
FIG. 5 shows the sequence of steps on the Web server during remote authoring of an on-line service.

When the Web server program receives an HTTP PUT request in step 124, it passes it to the control script 88. The control script examines the parameters of the retrieve request, and writes an output file in step 126 that contains either the requested document or script, or an error message for the service author indicating why the request could not be satisfied. Generally speaking, the Web server program translates the URL into a file name in the file name space used by the operating system of the server machine. Such mappings are usually found in a configuration file for the server. The control script can also be made to perform such translation and maintain its own configuration file of mappings. This can be done so that the server does not have to be reinitialized when mappings change, for example, by the creation of a new service. The detailed operation of the control script is shown in FIG. 5, and is explained further below. When the control script has finished execution, the Web server sends the resulting output file to the client authoring tool via an HTTP response in step 128.

The authoring tool then receives the HTTP response, containing the document or script that the author requested, and the authoring tool displays the document or script in a new window in step 130, using an appropriate editor. If the response contains an error message for the service author then it is handled in the normal way that an editor program handles the case when a requested file cannot be found. In step 132 the service author edits the retrieved document using the appropriate editor. At any point during the editing process, the service author may issue a command to save the current version of the document or script being edited, as noted in step 134. The save command causes the authoring tool client program to send a replace request to the server.

Figure 6B:
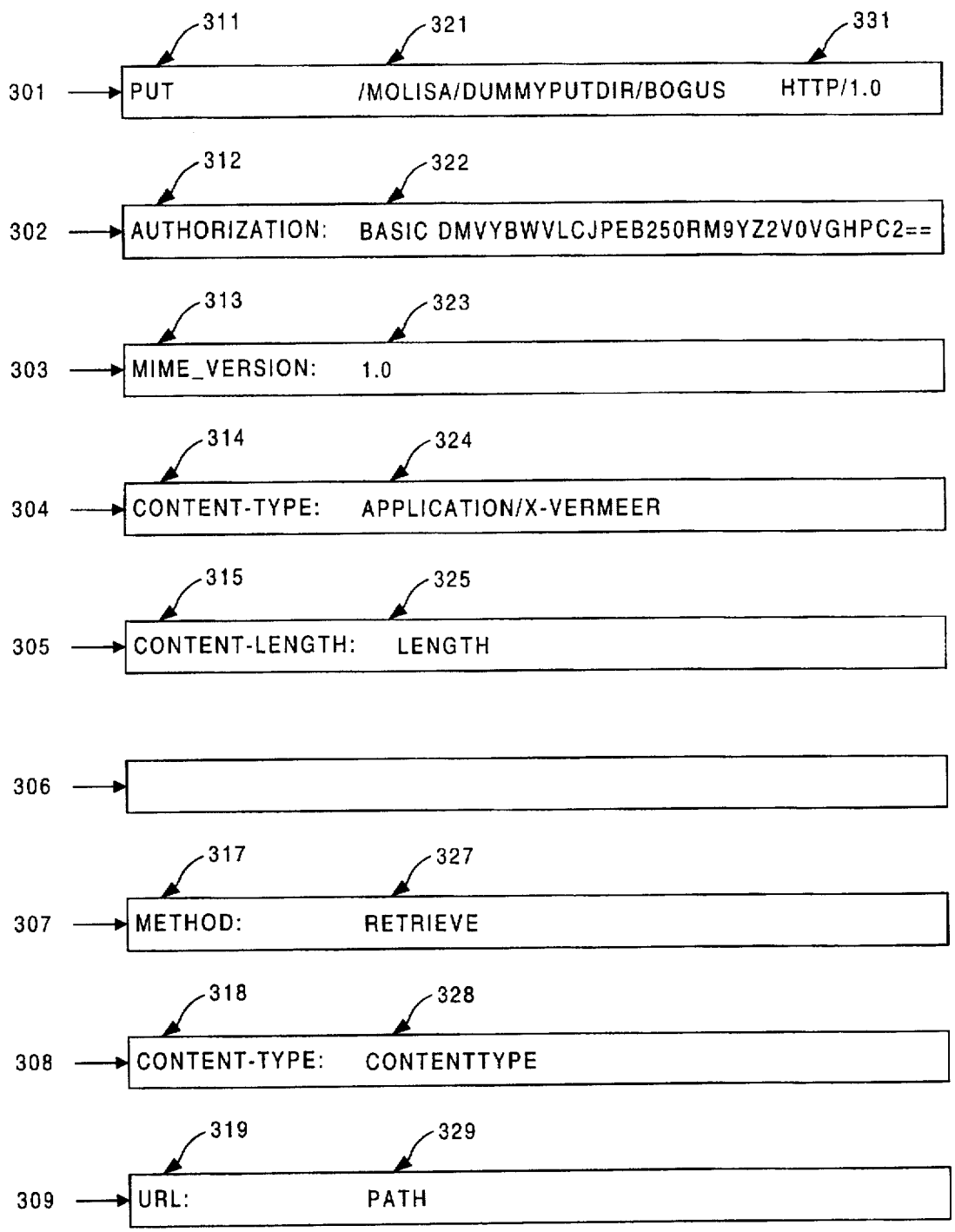

The replacement process is similar to the retrieval process described earlier. The authoring tool program sends an HTTP PUT request to the Web server where the service is stored 136. The structure of this PUT request is shown in FIG. 6b, and includes header fields for authorization, the MIME version number, the request content type, and the content length in bytes. The body of the request includes a method command field that identifies the request as a replace request, a URL command field giving the URL where the document or script is to be stored, and the contents of the script or document that is to be saved on the server.

As with the retrieve request, when the Web server program receives an HTTP PUT request, the server program in step 138 passes it to the control script 88. The control script examines the parameters of the replace request, and attempts to store the document or script on the server at the location given by the URL (step 140), and writes an output file that either contains a status message indicating that the request was completed, or contains an error message for the service author indicating why the request could not be satisfied (step 142). The detailed operation of the control script is shown in FIG. 5, and is explained further below. When the control script has finished execution, the Web server sends the resulting output file to the client authoring tool via an HTTP response in step 144.

When the authoring tool receives the HTTP response, if the response is an error message then the error message is displayed for the service author in step 146. Otherwise the authoring tool informs the user that the document or script was successfully saved on the Web server machine in step 146. In either event, the authoring tool waits for a new command from the service author.

FIGS. 6a and 6b show the structure of the HTTP request messages that the authoring tool sends to the Web server. In each case the parameter "length" on the "Content-length" line is replaced by the number of characters in the content part of the message (the part of the message that follows the Content-length line). The HTTP requests include a single request line, followed by header fields in the HTTP header, followed by a blank line, followed by command fields in the HTTP request body, followed by optional data in the HTTP request body. Header fields have a header field name followed by colon (":") and a header field value. Command fields have a command field name followed by a colon (":") and a command field value. The format of the request line and header fields is defined by the HTTP protocol specification, while the format of the HTTP request body, including the command fields, is defined by the method of our invention.

FIG. 6a shows the HTTP request message format for a "retrieve" request. The first line 201 is the request line, comprising the "PUT" method name 211, followed by the URL for the object to be retrieved 221, followed by the HTTP protocol version number 231. The second line 202 is the authorization header field, comprising the header field name 212, e.g., "Authorization," followed by the header field value 222, in this case "Basic dmVybWVlcjpEb250Rm9yZ2V0VGhpcw==." This authorization field may be used to carry passwords for protection purposes by the Web server. For example, the Web server may only allow use of the PUT request message by particular users. Also, the Web server could look to the password when a user attempts to write to a file using the Web server. These and other security devices may be used in connection with this invention. The third line 203 is the MIME version header field, comprising the header field name 213, e.g., "MIME_version," followed by the header field value 223, e.g., "1.0". The fourth line 204 is the content type header field, comprising the header field name 214, e.g., "Content-type," followed by the header field value 224, e.g., "application/x-vermeer." The fifth line 205 is the content length header field, comprising the header field name 215, e.g., "Content-length," followed by the header field value 225 giving the length in bytes of the HTTP request body. The sixth line 206 is the blank line that separates the header fields from the HTTP request body. The seventh line 207 is the method command field, comprising the command field name 217, e.g., "method," followed by the command field value 227, "retrieve." The eighth line 208 is the URL command field, comprising the command field name 218, "url," followed by the command field value 228 giving the URL for the object on the server machine that is to be retrieved.

FIG. 6b shows the HTTP request message format for a "replace" request. The first line 301 is the request line, comprising the "PUT" method name 311, followed by the URL 321 giving the location on the server where the document should be saved, followed by the HTTP protocol version number 331. The second line 302 is the authorization header field, comprising the header field name 312, e.g., "Authorization," followed by the header field value 322, e.g., "Basic dmVybWVlcjpEb250Rm9yZ2V0VGhpcw==." The third line 303 is the MIME version header field, comprising the header field name 313, e.g., "MIME$_{13}$ version," followed by the header field value 323, e.g., "1.0". The fourth line 304 is the content type header field, comprising the header field name 314, e.g., "Content-type," followed by the header field value 324, e.g., "application/x-vermeer." The fifth line 305 is the content length header field, comprising the header field name 315, e.g., "Content-length," followed by the header field value 325 giving the length in bytes of the HTTP request body. The sixth line 306 is the blank line that separates the header fields from the HTTP request body. The seventh line 307 is the method command field, comprising the command field name 317, e.g., "method," followed by the command field value 327, e.g., "replace." The eighth line 308 is the content type command field, comprising the command field name 318, e.g., "Content-type," followed by the command field value giving the content type identifier 328. The ninth line 309 is the URL command field, comprising the command field name 319, e.g., "url," followed by the command field value 329 giving the URL for the object on the server machine that is to be replaced.

The operation of the control script 88 as running on the server machine, will now be described in connection with FIG. 5. As described above, in this embodiment the Web server program calls the control script when a retrieve or replace request arrives from the authoring tool. The control script processes the retrieve or replace request and writes an output file that the Web server will send back to the client as the response to the retrieve or replace request.

As shown in FIG. 5, when the Web server calls the control script, the control script first reads the "Content-type" header field of the HTTP request header to get the document type in step 160. A test is performed to see if the document type given in the header field is "application/x-vermeer" (step 162). If the request is not from the authoring tool, then the control script writes an error message to the output file 164 and the control script terminates. When the document type indicates that the request is from the authoring tool, then the test performed in step 162 yields the answer, "Yes," and the control script reads the command fields from the body of the HTTP request (step 166). A test is then performed in step 168 in order to determine if the command fields are acceptable. This test involves determining whether: (1) there is a "method" command field (2) there is a "URL" command field, and (3) the command fields are syntactically correct. If the command fields are not correct, then the control script writes an error message to the output file in step 170 and the control script terminates. If the command fields are acceptable, then the test in step 168 yields the answer "Yes" and the control script performs a test to determine if the "method" command field value indicates a retrieve request (step 172). If so, then another test is performed to determine if the file given in the "URL" command field value exists and is readable (step 174). If the result is "Yes" then the control script sets the content type by examining the file name extension in step 176. The control script then writes the HTTP response header containing the content type, and the data content of the indicated file, to the output file in step 178, and the control script terminates. If test in step 174 yields the answer "No" then the control script writes an error message to the output file in step 180 and the control script terminates.

If the "method" command field does not indicate a "retrieve" request then the test in step 172 yields the answer "No" and a test is performed to see if the command field indicates a "replace" request (step 182). If the "method" command field does not indicate a "replace" request then the test 182 yields the answer "No," the control script writes an error message to the output file in step 194, and the control script terminates. Otherwise, if the "method" command field indicates a "replace" request, then another test is performed in step 184 to determine if the file given in the "URL" command field value may be written by the authoring tool and this user. For example, the file may be written if the file does not currently exist, or if the file exists and the service author has authorization to write the file. Authorization may be determined by the Web server, to see if the user attempting to write to a file has provided a correct password. Authorization may also be determined by the underlying operating system, to see if the Web server has authorization to write to the file specified by the URL. If the result of the test in step 184 is "Yes" then the control script stores the data of the HTTP request body in the file indicated by the "URL" command field value (step 186). The control script then sets the appropriate file permissions on the new file in step 188, writes the status message indicating the result of the command into the output file in step 190, and the control script terminates. If the file cannot be written then the test 184 yields the answer "No," the control script writes an error message to the output file in step 192, and the control script terminates.

An advantage of this system is that the client authoring tool does not need to map the file name space of the server to its own file name space. This arrangement is particularly advantageous in large networks, such as the Internet, where there may be many authors of many on-line services on many servers. In this environment, the ability to remotely author documents is made easier and eliminates the need for compex file systems like a network file system.

Another advantage of this system is that the ability to store files on the server is made possible in a manner which is transparent to usage by any Web browser. By using a control script to control processing of messages, the server also need not be modified. The server is simply configured to recognize the control script, thus allowing easy installation.

Having now described an embodiment of the invention, it should be understood that the foregoing description is merely illustrative, having been presented by way of example only. Numerous other embodiments and modifications may be made. For example, the invention is not limited to use on the Internet or using the World Wide Web or using the HTTP communication protocol. For example, the file transfer protocol (FTP) could also be used, using "get" and "put" commands in that protocol. Other protocols using messages communicated over TCP/IP connections are also possible. A mix of such protocols may also be used to perform retrieval or storage functions. It is also possible that a service author will keep local copies of document objects of an on-line service so that only a remote storage function is used. Additionally, systems in which a client program modifies and stores documents and programs on the server using protocols over a TCP/IP connection between the client and the server are also within the scope of the invention. The client and server may be connected by the Internet, or a private local or wide area network or may be on the same machine. The client authoring tool may be configured to communicate only with the server. The processing of messages need not be provided by a control script added to the server, but may also be made possible by modifications to the server. These and other embodiments are considered to be within the scope and spirit of the present invention which is defined by the appended claims.

APPENDIX

```
!/usr/local/bin/tclsh file put_script

This is a put_script for a CERN server that supports the following
# operations in the Vermeer authoring tool client:
#       retrieve  - retrieve a document
#       replace         - replace a previously existing document
#                               (error if it didn't previously exist
#                                or if date/time is later than that passed in)
#       create          - create a new document
#                               (error if it previously existed)
#       parse           - parse a basic document and return tcl
#       index           - index a document
#                               (indexes should still be recreated regularly).
#       listservices    - return a list of services on the server.
#       linkmap         - return a linkmap of documents on the server.

# This script is triggered by an HTTP PUT method, but HTTP POST method
# could also be used.

# proc DBG 'debug-string'

# if debugging is enabled (/tmp/debug_put_script exists) then
# write the debug-string to /tmp/put_script.dbg

proc DBG str {
    global dbgon
    global df if ![info exists dbgon] {
        set dbgon [file exists /tmp/debug_put_script]
        if $dbgon {
            set df [open /tmp/put_script.dbg "w"]
        }
    } if $dbgon {
        puts $df $str
    }
} proc error 'error-string'

Generic error routine for getting a string back to client
# Note that this terminates the current process

proc error str {

DBG "error - '$str'"
    puts stdout "Content-Type: text/html
```

```
<html>
<head>
<title>Bad Request</title>
</head>
<body>
<h1>Bad Request</h1>
<hr>
$str
</body>
</html>"

exit 0
} proc mktempfile 'File' 'Filename'

Create and open for writing a temporary file in $TMPDIR

proc mktempfile { File Filename } {
    upvar 1 $File file
    upvar 1 $Filename filename
    global tmpdir
    global tmpcount
    global env if ![info exists tmpdir] {
            if [info exists env(TMPDIR)] {
                set tmpdir $env(TMPDIR)
            } else {
                set tmpdir /tmp
            }
            set tmpcount 0
    }

# Need a way to ensure exclusive create...
    # (and maybe put a process id in here...)
    set filename $tmpdir/VTtmp$tmpcount
    incr tmpcount
    while {[file exists $filename] == 1} {
            set filename $tmpdir/VTtmp$tmpcount
            incr tmpcount
    } set file [open $filename w]
} proc readline 'input line'

Routine for reading a single line from stdin.
# Reads no more than env(CONTENT_LENGTH) characters
# (otherwise the process would hang waiting for nonexistent input)
```

```
# Strips trailing CR.
# returns -1 if no more input.

proc readline Line {
   upvar $Line line global contentlength
   global env if ![info exists contentlength] {
         if { [info exists env(CONTENT_LENGTH)] } {
            set contentlength $env(CONTENT_LENGTH)
         } else {
            DBG "no CONTENT_LENGTH environment variable"
            set contentlength 0
         }
         DBG "contentlength - $contentlength"
   } if { $contentlength <= 0 } {
         return -1
   } if { [gets stdin line] < 0 } {
         return -1
   } don't fully understand CRLF issues, but for now...
   incr contentlength [expr 0 - ( [string length $line] + 1 )]
   set line [string trimright $line "\r"]

DBG "input - '$line'"

return 0
}

Execution starts here if { [catch {

DBG "in put_script"

# Make sure we have a document of type "application/x-vermeer"

if ![info exists env(CONTENT_TYPE)] {
   error "no content-type\nneed content-type: application/x-vermeer"
} if { [string tolower $env(CONTENT_TYPE)] != "application/x-vermeer" } {
   error "bad content-type: $env(CONTENT_TYPE)\nneed content-type: application/x-vermeer"
}
```

Page 4 of 9

```

# Read operation headers
# Put them in the associative array 'headers', indexed by header name

while 1 {
   if {[readline line] < 0} {
        # no more input
        break
   } if { 0 == [string length $line] } {
        # blank line, end of headers
        break
   } set ws "\[ \t\]*"
   set alpha "\[-A-Za-z\]"
   set searchexpr "$ws\($alpha+\)$ws:$ws\(.*\)"
   if [regexp $searchexpr $line foo name value] {
        set headers([string tolower $name]) $value
   } else {
        error "bad header - \"$line\""
   }
}

# Compute 'pathroot' and 'molisaroot' for future reference

if {[info exists env(PATH_TRANSLATED)] && [info exists env(PATH_INFO)]} {
   set ix [string last $env(PATH_INFO) $env(PATH_TRANSLATED)]
   set pathroot [string range $env(PATH_TRANSLATED) 0 [expr $ix-1] ]
} else {
   error "cannot determine root of document tree"
} set molisaroot [format "%s/Molisa" $pathroot]

Most methods require a target url.
# Get and check it if it exists.

if [info exists headers(url)] {
   set url $headers(url)
   set fullurl $pathroot$url
   set urlextension [file extension $url]

if { 0 != [string first "/Molisa" $url] } {
        error "document is not underneath /Molisa - $url"
   }
} else {
   set url ""
   set fullurl ""
```

```
    set urlextension ""
}

# Get the method

if ![info exists headers(method)] {
    error "no method header"
} set method $headers(method)

DBG "method = '$method'"

# Case off method

if { 0 == [string compare $method linkmap] } {
    set result [exec $molisaroot/internal/getlinks.tcl $molisaroot/internal/geturl $fullurl]

puts stdout "Content-Type: application/x-vermeer-linkmap\n"
    puts stdout $result
    exit 0
} elseif { 0 == [string compare $method listservices] } { these are the Molisa directories that are _not_ services
    set reserved { internal lib dummyputdir }
    set rawlist [exec ls $molisaroot]

set services ""
    foreach f $rawlist {
        if { [file isdirectory $molisaroot/$f] &&
             (-1 == [lsearch -exact $reserved $f]) } {
            lappend services $f
        }
    }
    puts stdout "Content-Type: vermeer/x-vermeer-servicelist\n"
    foreach f $services {
        puts stdout $f
    }
    puts stdout "ENDOFLIST"
    exit 0
} elseif { 0 == [string compare $method index] } {

# Index

    DBG "entered index"

set indexer /usr/local/bin/waisindex
    if ![file exists $fullurl] {
        error "document does not exist - $url"
    } if ![file exists $indexer] {
```

```
        error "indexer does not exist - $indexer"
    }
    if ![file readable $fullurl] {
        error "document not readable - $url"
    } if [file isdirectory $fullurl] {
        DBG "directory index branch"
        set service [file tail $url]
#   We use a Web directory for the html pages, and a parallel wais
#   directory, rather than mixing wais index files into the Web hierarchy
        set www [file dirname $pathroot]/wais/$service catch { exec $indexer -mem 2 -l 1 -export -d $www \
            -t URL $molisaroot/$service http://zorch.tiac.net/Molisa/$service \
            -r $molisaroot/$service} result
        DBG "result = -$result-"
    } else {
        DBG "file index branch"
        set below [string range $url 8 end]
        set service [file dirname $below]
#   We use a Web directory for the html pages, and a parallel wais
#   directory, rather than mixing wais index files into the Web hierarchy
        set www [file dirname $pathroot]/wais/$service
        DBG "molisaroot/below = $molisaroot/$below"
        catch { exec $indexer -mem 2 -l 1 -export -d $www \
            -t URL $molisaroot/$service http://zorch.tiac.net/Molisa/$service \
            -r $molisaroot/$service} result
        DBG "result = -$result -"

} puts stdout "Content-Type: text/html

<html>
<head>
<title>Indexing of $url</title>
</head>
<body>
<h1>Indexing of $url succeeded</h1>
<pre>"

puts -nonewline stdout $result
        puts stdout "
</pre>
</body>
</html>"
    exit 0
} elseif { 0 == [string compare $method retrieve] } {

# Retrieve

    if ![file exists $fullurl] {
        error "document does not exist - $url"
```

```
}
if ![file readable $fullurl] {
        error "document not readable - $url"
} if { 0 == [string compare $urlextension .html] } {
        set contenttype text/html
} elseif { 0 == [string compare $urlextension .bas] } {
        set contenttype text/x-basic
} elseif { 0 == [string compare $urlextension .tcl] } {
        set contenttype text/x-tcl
} else {
        set contenttype application/binary
} puts stdout "Content-Type: $contenttype\n"

set input [open $fullurl r]
while {[gets $input line] >= 0} {
        puts stdout $line
}
close $input exit 0
} elseif { ( 0 == [string compare $method replace] ) ||
          ( 0 == [string compare $method create] ) } {

# Replace or create

# May already exist if we're replacing
# Must not exist if we're creating
  if { 0 == [string compare $method replace] } {
#       if ![file exists $fullurl] {
error "document does not exist - $url"
}
  } else {
        if [file exists $fullurl] {
            error "document exists - $url"
        }
  } if [catch { set output [open $fullurl w] }] {
        error "document not writable - $url"
  }

# Assume text
  set text 1
  if [info exists headers(content-type)] {
        set contenttype $headers(content-type)
        if ![regexp -nocase "^text/" $contenttype] {
            set text 0
        }
  }
  DBG "text = '$text'"
```

Page 8 of 9

```
    if { $text } {
         while { [readline line] >= 0 } {
             puts $output $line
         }
    } else {
         DBG "about to read '$contentlength' bytes"
         exec >@ $output $molisaroot/internal/read $contentlength
}
    close $output

# Quick detection of executable files
    # If the directory name is "Scripts" make it executable
    if {0 == [string compare Scripts [file tail [file dirname $fullurl]]]} {
         exec chmod a+x $fullurl
    } puts stdout "Content-Type: text/html

<html>
<head>
<title>Create/replace succeeded</title>
</head>
<body>
<h1>Create/replace succeeded</h1>
</body>
</html>"

exit 0
} elseif { 0 == [string compare $method parse] } {

# Parse

    mktempfile basicFile basicFileName while { [readline line] >= 0 } {
         puts $basicFile $line
    }
    close $basicFile mktempfile tclFile tclFileName
    close $tclFile set fail [catch {exec $molisaroot/internal/parser <$basicFileName >$tclFileName} result]

if {$fail} {
         puts stdout "Content-Type: text/html

<html>
<head>
<title>Parse failed</title>
</head>
<body>
<h1>Parse failed</h1>
<pre>
```

```
$result
</pre>
</body>
</html>"

} else {
        puts stdout "Content-Type: text/html

<html>
<head>
<title>Parse succeeded</title>
</head>
<body>
<h1>Parse succeeded</h1>
<pre>"

set tclFile [open $tclFileName "r"]
        while {[gets $tclFile line] >= 0} {
           puts stdout $line
        }
        puts stdout "</pre>
</body>
</html>"
   } exec rm $basicFileName $tclFileName
}

} vfr_put_result] } {
   DBG "put caught - '$vfr_put_result'"
   puts stdout "Content-Type: text/html <HEAD><TITLE>Put Error</TITLE></HEAD><BODY>
<H1>Put Error</H1><pre>$vfr_put_result</pre></body>"
   exit 0
}
```

What is claimed is:

1. A computer-implemented process for a client to remotely edit a document object stored on a server, wherein the client and the server communicate using an HTTP protocol over a connection, comprising the steps of:

(a) establishing the connection between the client and the server;

(b) the client sending an HTTP request message over a TCP/IP connection to the server, wherein the HTTP request message specifies the document object and an indication that the client requests retrieval of the document object;

(c) the server receiving the HTTP request message and calling a script;

(d) the script retrieving a copy of the document object;

(e) the server sending the copy of the document object to the client over the TCP/IP connection in an HTTP response message;

(f) the client receiving the HTTP response message including the copy of the document object;

(g) the client permitting editing of the copy of the document object;

(h) the client sending another HTTP request message to the server, wherein said other HTTP request message contains a copy of an edited document object and an indication of a location on the server to store the copy of the edited document object and an indication that the client requests storage of the edited document object;

(i) the server receiving the other HTTP request message and calling the script;

(j) the script storing the copy of the edited document object on the server according to the indication of the location included in the other HTTP request message; and (k) terminating the connection.

2. The process of claim 1, further comprising the step of the script checking authentication and wherein the step of the script retrieving the copy of the document object includes retrieving the copy only when access to the document object is authenticated.

3. The process of claim 1, further comprising the step of mapping the indication of the location of the document object to a file name on the server.

4. The process of claim 1, further comprising the step of the server responding with an HTTP response message to a client program, indicating one of acknowledgment that the document object was successfully saved and giving an error indication.

5. The process of claim 4, further comprising the step of terminating the TCP/IP connection after the step of the server sending a response message.

6. The process of claim 1, wherein the document object is part of an online service on the World Wide Web.

7. The process of claim 1, wherein the document object comprises an HTML file.

8. The process of claim 1, wherein the document object is a computer program written in a computer programming language.

9. The process of claim 1, wherein the script is a single computer program which processes both retrieve and store requests and is called by the server in response to either a store or a retrieve request from the client.

10. The process of claim 1, wherein the HTTP protocol includes a named message method which indicates transfer of arbitrary data from the client to the server and wherein the client sends the server a message including a name of the named message method for both retrieve and store requests.

11. The process of claim 10, wherein the named message method is an HTTP "PUT" message.

12. The process of claim 10, wherein the named message method is an HTTP "POST" message.

13. The process of claim 1, wherein the server and the client are on the same computer.

14. The process of claim 1, wherein the server and the client are on separate computers that are interconnected by a network.

15. The process of claim 14, wherein the network is a local area network.

16. The process of claim 14, wherein the network is an Internet network.

17. The process of claim 1, wherein the server calls one of a plurality of scripts.

18. The process of claim 1, wherein the connection established is a TCP/IP connection.

19. The process of claim 1, wherein the document object is an HTML file including an embedded graphic image.

20. A computer-implemented process for remotely editing an electronic document stored on a server, using a client, wherein the server and the client are connected via a communication channel using a communication protocol, and wherein the client has a first file name space and the server has a second file name space and no file in the second file name space can be accessed using the name of a file in the first file name space, comprising the steps, performed by the client, of:

(a) sending a request message in the communication protocol over the communication channel to the server requesting a copy of the electronic document;

(b) receiving a response message in the communication protocol from the server over the communication channel, wherein the response message contains the copy of the electronic document;

(c) permitting editing of the copy of the electronic document at the client; and (d) sending another request message in the communication protocol including the edited electronic document over the communication channel to the server, wherein said message includes an indication of a location on the server where the electronic document is to be stored, said location being automatically mapped by the server to a name of a file in the second file name space.

21. A computer-implemented process for remotely editing an electronic document stored on a server, using a client, wherein the server and the client are connected via a communication channel using a communication protocol, comprising the steps, performed by the client, of:

(a) sending a request message in the communication protocol over the communication channel to the server requesting a copy of an electronic document using a name mappable to a file name space of the server and not mappable to a file name space of the client;

(b) receiving a response message in the communication protocol from the server over the communication channel, wherein said response message contains the copy of the electronic document;

(c) permitting editing of the copy of the electronic document at the client; and (d) sending another request message in the communication protocol including the edited electronic document over the communication channel to the server, wherein said message includes an indication of a location on the server where the electronic document is to be stored, said location being automatically mapped to a name of a file in the file name space of the server.

22. A computer system for use with a server connected to a client via a communication channel using a communication protocol, wherein the client has a first file name space and the server has a second file name space, and the first file name space does not include names of files that map to names of files in the second file name space, the client comprising:

(a) means for sending a request message over the communication channel in the communication protocol to the server for a copy of an electronic document;

(b) means for receiving a response message in the communication protocol from the server and over the communication channel, wherein the response message contains the copy of the electronic document;

(c) means for permitting editing of the copy of the electronic document at the client; and (d) means for sending a request message in the communication protocol including the edited electronic document over the communication channel to the server, wherein said message includes an indication of a location on the server where the electronic document is to be stored, so that the server will automatically map the location to a name of a file in the second file name space.

23. A computer system for use with a client connected to a server via a communication channel using a communication protocol, wherein the client has a first file name space and the server has a second file name space, and the first file name space does not include names of files that map to names of files in the second file name space, the server comprising:

(a) means for receiving a request message over the communication channel in the communication protocol from the client for a copy of an electronic document;

(b) means for retrieving the copy of the electronic document;

(c) means for sending a response message in the communication protocol to the client and over the communication channel, wherein the response message contains the copy of the electronic document;

(d) means for receiving another request message in the communication protocol including an edited copy of the electronic document over the communication channel and from the client, wherein said message includes an indication of a location on the server where the electronic document is to be stored;

(e) means for mapping automatically the location to a name of a file in the second file name space; and (f) means for storing the edited electronic document in the second file name space.

24. A computer-implemented method for editing an electronic document for use in connection with a client connected to a server via a communication channel using a communication protocol, wherein the client has a first file name space and the server has a second file name space, and the first file name space does not include names of files that map to names of files in the second file name space, comprising the steps, performed by the server, of:

(a) receiving a request message over the communication channel in the communication protocol from the client for a copy of the electronic document;

(b) retrieving the copy of the electronic document;

(c) sending a response message in the communication protocol to the client over the communication channel, wherein the response message contains the copy of the electronic document;

(d) receiving another request message in the communication protocol including an edited copy of the electronic document over the communication channel from the client, wherein said message includes an indication of a location on the server where said electronic document is to be stored;

(e) automatically mapping the location into a name of a file in the second file name space; and (f) storing the edited copy of the electronic document in the second file name space.

25. A computer-implemented process for remotely editing an electronic document stored on a server, wherein the client and the server communicate over a communication channel using a communication protocol, and wherein the client has a first file name space and the server has a second file name space, and the first file name space does not include names of files that map to names of files in the second file name space, comprising the steps of:

(a) the client establishing the communication channel with the server;

(b) the client sending a request message in the communication protocol over the communication channel to the server, wherein the message specifies the electronic document and an indication that the client requests retrieval of the electronic document;

(c) the server receiving the request message and verifying the access of the client to the requested electronic document;

(d) the server retrieving a copy of the electronic document if the access of the client is verified;

(e) the server sending the copy of the electronic document to the client over the communication channel in a response message in the communication protocol;

(f) the client receiving the response message from the server including the copy of the electronic document;

(g) the client permitting editing of the copy of the electronic document by a user;

(h) the client sending another request message over the communication channel in the communication protocol to the server, wherein said message contains a copy of the edited document and an indication of a location on the server where said document is to be stored;

(i) the server receiving the other request message and automatically mapping the location into a name of a file in the second file name space;

(j) the server storing the copy of the edited document in the second file name space; and (k) the server sending another response message acknowledging an attempt at storage of the copy of the edited document.

26. A computer system for remotely editing an electronic document, comprising:

(a) a communication channel using a communication protocol that interconnects a server to a client, wherein the client has a first file name space and the server has a second file name space, and the first file name space does not include names of files that map to names of files in the second file name space;

(b) the client comprising:

(i) means for sending a request message over the communication channel in the communication protocol to the server, for a copy of the electronic document;

(ii) means for receiving a response message in the communication protocol from the server over the communication channel, wherein the response message contains the copy of the electronic document;

(iii) means for permitting editing of the copy of the electronic document at the client; and (iv) means for sending another request message in the communication protocol including the edited copy of the electronic document over the communication channel to the server, wherein said message includes an indication of a location on the server where said document is to be stored; and (c) the server comprising:

(i) means for receiving the request message over the communication channel in the communication protocol from the client, for the copy of the electronic document;

(ii) means for retrieving the copy of the electronic document;

(iii) means for sending the response message in the communication protocol to the client over the communication channel, wherein said message contains the copy of the electronic document;

(iv) means for receiving the other request message in the communication protocol including the edited copy of the electronic document over the communication channel from the client, wherein said message includes the indication of the location on the server where said document is to be stored;

(v) means for automatically mapping the location on the server into a name of a file in the second file name space; and (vi) means for storing the edited copy of the electronic document on the server in the second file name space.

27. A method for a server to process a request message from an editor implemented in software executed by a client, comprising the steps of:

(a) determining whether the request message is from the editor of the client;

(b) determining whether the request message is for retrieval of a document object when the request message is from the editor of the client;

(c) sending a response message to the editor of the client including a copy of the document object when the request message is for retrieval of said object;

(d) determining whether the request message is for storage of the copy of the document object on the server when the request message is from the editor of the client, said message including an indication of a location where said object is to be stored on the server;

(e) automatically mapping the location into a name of a file in the second file name space;

(f) storing the copy of the document object in the second file name space when the request message is for storage of said object; and (g) sending another response message to the editor of the client acknowledging storage of the document object when the request message is for storage of said object.

28. A process for saving a document object on a server in response to a request from a client, wherein the client has a first file name space and the server has a second file name space and the first file name space does not include names of files that map to names of files in the second file name space, comprising the steps of:

(a) the client sending a request message to the server, wherein the request message includes a document object, an indication of a location on the server where the document object is to be stored;

(b) the server receiving the request message and automatically converting the indication of the location on the server into a name of a file in the second file name space;

(c) the server storing the document object as a file using the name of the file in the second file name space; and (d) the server sending a response message to the client that acknowledges the storage of the document object.

29. In a client/server computer system for remotely editing document objects stored on a server, a client comprising:

(a) an editing system having inputs connected to receive editing commands, a memory for storing a document object while it is edited in response to the editing commands, and an output for displaying the document object to the user during editing;

(b) a retrieve request message processor having an input connected to the server over a communication channel to receive an indication of the document object on the server to be retrieved and an output providing a retrieve request message, said retrieve request message including an indication of the document object;

(c) a response message processor having an input connected to receive a response message from the server and operative when the retrieve request message section sends a retrieve request message to the server, wherein the response message includes the document object, and an output providing the document object to the memory of the editing system; and (d) a store request message processor, connected to access the memory of the editing system, and having an input connected to receive an indication of a location on the server for storing the document object and an output providing a store request message including the edited document object and the indication of the location on the server where the document object is to be stored, wherein the output connects to the communication channel connected to the server.

30. In a client/server computer system in which a client remotely edits document objects stored on a server, the server comprising:

(a) a memory in which document objects are stored;

(b) a retrieve request message processor having an input connected to receive a retrieve request message from the client, wherein the retrieve request message includes an indication of a document object stored on the server, and wherein the retrieve request message processor accesses the memory to retrieve the document object indicated in the retrieve request message, said retrieve request message processor further having an output providing a response message, including the retrieved document object, to the client; and (c) a store request message processor having an input connected to receive a store request message from the client, wherein the store request message includes a document object and an indication of a location on the server for storing the document object, said store request message processor automatically mapping the location into a file name space employed by the server and storing the document object in said file name space.

* * * * *